UNITED STATES PATENT OFFICE.

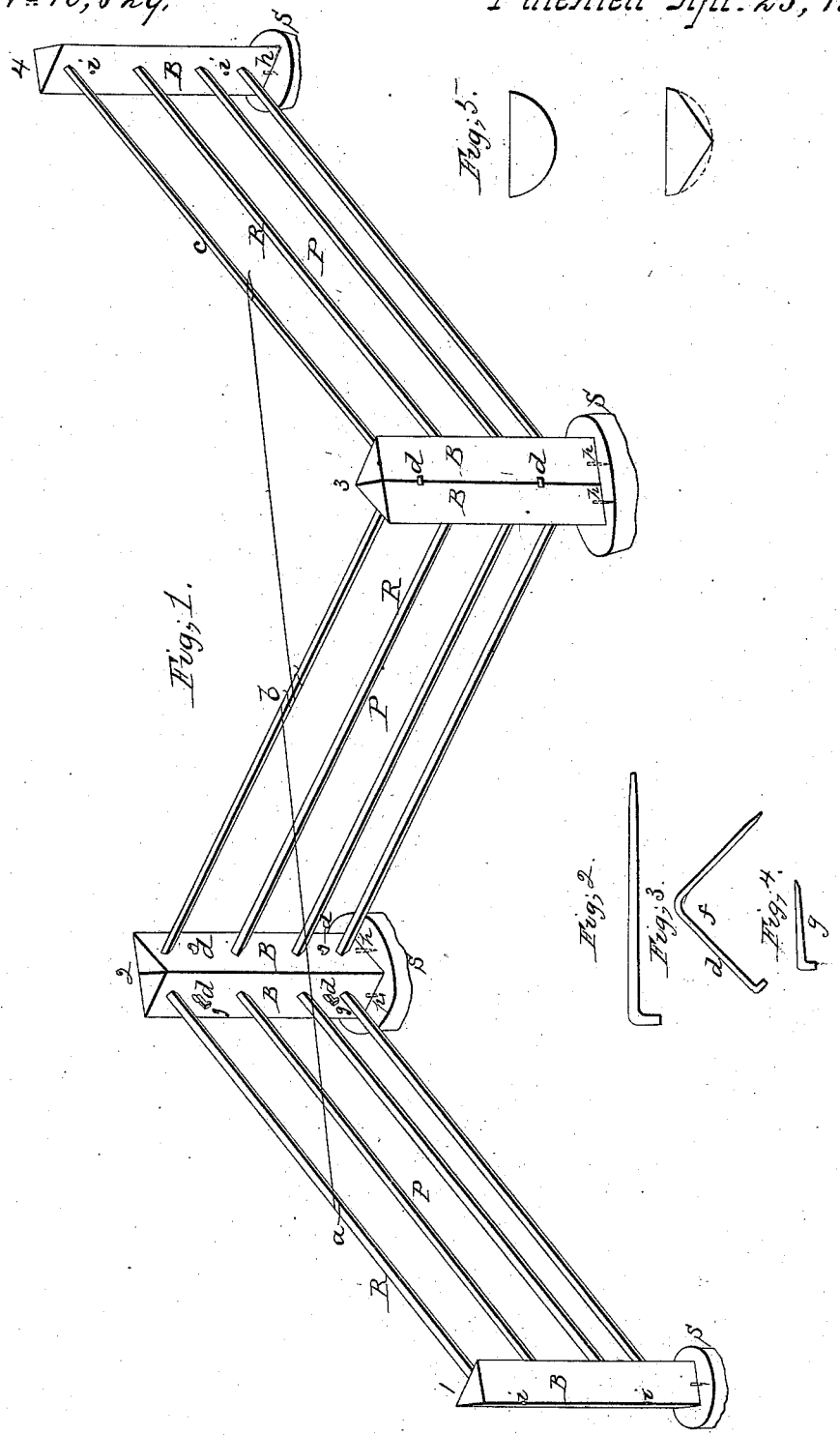
D. R. Prindle,
Wood Fence,
Nº 10,829.
Patented Apr. 25, 1854.

DANIEL R. PRINDLE, OF EAST BETHANY, NEW YORK.

FIELD-FENCE.

Specification of Letters Patent No. 10,829, dated April 25, 1854.

*To all whom it may concern:*

Be it known that I, DANIEL R. PRINDLE, of East Bethany, in the county of Genesee and State of New York, have invented a new and useful Improvement in Fences; and I do hereby declare that the following is a full, clear, and exact description of the construction and operation of the same, reference being had to the annexed drawing, forming part of this specification, in which—

Figure 1 is a perspective view of the fence. Fig. 2 is a view of the metal connection, before insertion. Fig. 3 is a view of the metal connection after the panel has been moved to its position. Fig. 4 is a view of the wedge used to secure the metal connection. Fig. 5 is a cross section of semi-cylindrical post.

Similar letters indicate the same part.

The nature of my invention consists in the mode of fastening together the adjacent posts or standards of a field fence, by passing a piece of metal having a head on one end and through two adjacent posts, and securing the same by a wedge or its equivalent at the other end; the standards or posts being so beveled as to cause any desired angle to be made by the separate panels.

To enable others skilled in the art to make and use my invention I will proceed to describe its construction and operation.

In the drawing P represents the panels of the fence, each formed of beveled posts or standards B, connected in any suitable manner with rails R. These panels are joined together by the metal connections $d$, formed as shown in Fig. 2; the two panels being placed in the prolongation of each other, and the metal connection as shown in Fig. 2 passed through auger holes $i$ in the posts B in the direction of the rails R. After thus joining the panels they are moved so as to assume any desired angle with each other, the connections $d$ bending as shown at $f$ in Fig. 3 so as to accommodate themselves to the angle of the panels. The wedges $g$ are then driven into the auger holes $i$ securing the metal connections as shown in Fig. 1.

The connections should be made of wrought iron or any metal that will readily bend. There should be at least two connections between each pair of panels, though as many more may be added as may be deemed expedient. Between each pair of panels may be stretched a wire $a\ b, b\ c$ for adding to the stiffness of the fence. The posts may be made of split logs, as shown in Fig. 5, the convex surfaces being placed in contact, the panels united and the required angle given as above described. In exposed situations, the posts or standards B may rest upon stones S and be connected therewith by metal pins $p$ inserted in the stone and bottom of the post.

What I claim as my invention and desire to secure by Letters Patent, is—

The method herein described or its equivalent, of fastening together the adjacent posts or standards of a field fence; that is by passing a piece of metal having a head on one end through two adjacent posts, and securing the same by a wedge or its equivalent at the other end; the standards or posts being so beveled as to cause any desired angle to be made by any two adjacent panels.

In testimony whereof, I have hereunto signed my name before two subscribing witnesses.

D. R. PRINDLE.

Witnesses:
 GEO. PATTEN,
 SAML. GRUBB.